UNITED STATES PATENT OFFICE.

ROBERT O. HAYT, OF CORNING, NEW YORK.

FIRE-BRICK.

No. 798,788. Specification of Letters Patent. Patented Sept. 5, 1905.

Application filed December 9, 1904. Serial No. 236,230.

*To all whom it may concern:*

Be it known that I, ROBERT O. HAYT, a citizen of the United States, residing at Corning, in the county of Steuben, State of New York, have invented certain new and useful Improvements in Fire-Bricks; and I do hereby declare the following to be a full, clear, and exact description of the invention, such as will enable others skilled in the art to which it appertains to make and use the same.

This invention relates to materials for firebrick and other articles subjected to high temperatures, the object of the invention being to provide a material which may be readily given the desired shape and which when completed will possess refractoriness. It will of course be understood that the material in question may be used for whatever purpose it is adapted.

The present material embodies siloxicon and liquid silicate of sodium. "Siloxicon" is the commercial name of a material consisting of carbon, silicon, and oxygen.

In the manufacture of articles in accordance with the present invention liquid silicate of sodium is mixed with powdered siloxicon in such proportions as to form a plastic clay of such consistency as will permit it to be molded and retain its shape during the process of firing. The molded article is then subjected to a temperature of from 400° to 1,000° Fahrenheit, or sufficient to burn out the sodium, the result being an article having a hardness equal to the usual fire-brick and highly refractory.

It will of course be understood that the plastic may be applied to the inside of a furnace or wherever else desired and then fired, with the same general results.

It will be understood that in practice the proportions may be varied to suit different conditions.

What is claimed is—

1. The process of forming a refractory material which consists in mixing with finely-divided siloxicon, a liquid silicate of sodium and then burning out the sodium from the compound.

2. An article of the class described consisting of siloxicon and silicate of sodium combined and having the sodium burned therefrom.

3. The process of forming a refractory article consisting of mixing finely-divided siloxicon with liquid silicate of sodium, then forming the compound and finally burning therefrom the sodium.

4. The process of forming a refractory material which consists in mixing finely-divided siloxicon with a liquid silicate of sodium to form a yieldable substance, then molding the yieldable substance into a block and then subjecting the block to a high temperature.

In testimony whereof I affix my signature in presence of two witnesses.

ROBERT O. HAYT.

Witnesses:
   GEO. W. SAWYER,
   C. E. DRAKE.